(12) United States Patent
Graf

(10) Patent No.: US 7,550,077 B2
(45) Date of Patent: Jun. 23, 2009

(54) DOWNPIPE FILTER

(75) Inventor: Otto Graf, Teningen (DE)

(73) Assignee: Graf Plastics GmbH, Teningen (DE)

( * ) Notice: Subject to any disclaimer, the term of this patent is extended or adjusted under 35 U.S.C. 154(b) by 82 days.

(21) Appl. No.: 11/871,650

(22) Filed: Oct. 12, 2007

(65) Prior Publication Data

US 2008/0086953 A1    Apr. 17, 2008

(30) Foreign Application Priority Data

Oct. 12, 2006    (EP) .................................. 06021468

(51) Int. Cl.
*E04D 13/08* (2006.01)
(52) U.S. Cl. ............... 210/162; 210/170.03; 210/433.1; 210/446; 210/459; 52/12; 52/16
(58) Field of Classification Search ............. 210/162, 210/170.03, 433.1, 446, 459, 460; 52/12, 52/16
See application file for complete search history.

(56) References Cited

U.S. PATENT DOCUMENTS

| | | | |
|---|---|---|---|
| 1,283,278 A | | 10/1918 | Ott |
| 5,114,594 A | * | 5/1992 | Rosebrock et al. ....... 210/433.1 |
| 5,406,966 A | * | 4/1995 | Lepkowski et al. ......... 210/162 |
| 5,863,151 A | * | 1/1999 | Chapotelle ............. 210/170.03 |
| 5,985,158 A | * | 11/1999 | Tiderington ..................... 52/16 |
| 2005/0257433 A1 | * | 11/2005 | Dussault et al. ................ 52/12 |

FOREIGN PATENT DOCUMENTS

| | | |
|---|---|---|
| DE | 4237201 | 5/1994 |
| DE | 10223820 | 12/2003 |
| FR | 2675171 | 10/1992 |
| GB | 2391182 | 2/2004 |
| JP | 2000-73414 | * 3/2000 |

OTHER PUBLICATIONS

"Rainwater Usage System," pp. 37, 42 and 43, Catalogue R26, 2006 edition, Otto Graf GmbH, Kunststofferzeugnisse, D 79331 Tennengen, Germany.

* cited by examiner

*Primary Examiner*—Christopher Upton
(74) *Attorney, Agent, or Firm*—Plumsea Law Group, LLC

(57) ABSTRACT

The housing G of a downpipe filter A, which housing is to be mounted between downpipe ends 1, 2, has an exteriorly oriented outlet 6, an inner sieve device 32 and a collecting trough 27 communicating with the outlet 6, upper and lower housing parts 3, 4 each comprising a mounting socket S1, S2 for square downpipe ends 1, 2, and a housing intermediate section 5 at which the outlet 6 is provided and which housing intermediate section 5 is rotatable in relation to the housing parts 3, 4 about a housing axis X.

19 Claims, 5 Drawing Sheets

FIG. 2
FIG. 3
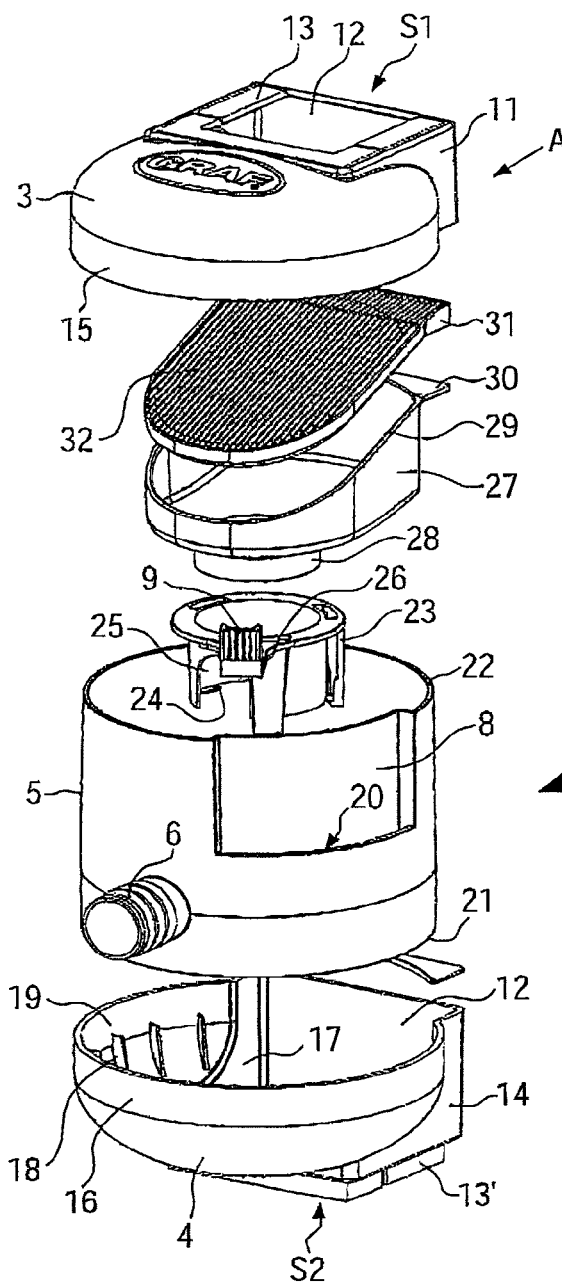
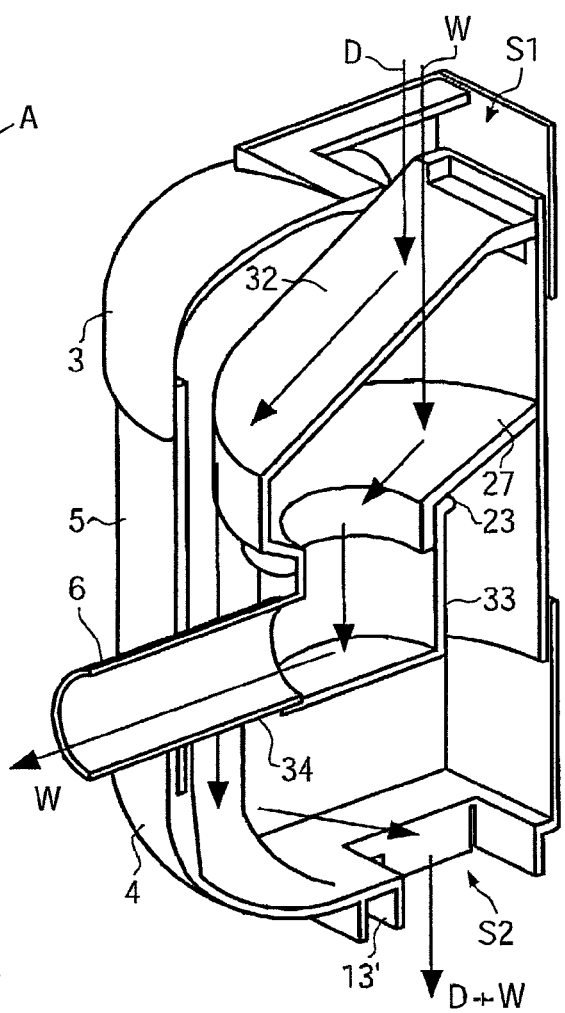

DOWNPIPE FILTER

BACKGROUND OF THE INVENTION

1. Field of the Invention

The invention relates to a downpipe filter for a building gutter system.

2. Background of the Invention

The downpipe filter known from DE 42 37 201 C2 and from the catalogue R26, edition 2006, "Rainwater Usage System", pages 37, 42 and 43, of the company Otto Graf GmbH, Kunststofferzeugnisse, D 79331 Tenningen, is mounted with the housing between the circular downpipe ends in the downpipe. Thanks to the roundness of the ends of the downpipe the downpipe filter can be brought into any desired rotary position in relation to the downpipe or a building wall such that an overflow connection can be formed by a straight rigid tube or a rigid hose. The collecting trough including the sieve insert can be positioned arbitrarily as a sub-unit in order to vary the gain of branched-off rainwater or to completely inhibit a gain (e.g. during wintertime). Since the housing is coaxial to the axis of the downpipe and is wider than the downpipe, relatively large mounting space is needed behind the downpipe and in the direction to an adjacent building wall.

The downpipe filter known from U.S. Pat. No. 1,283,278 A is mounted at a circular downpipe end. The box-shaped housing has a central dirt port at the lower side and two sidewardly oriented water outlets. In order to guide the rainwater branched-off from the downpipe to one or to the other or to both outlets an elbow tube provided in the interior of the housing can be rotated back and forth about the axis of the downpipe. The axis of the downpipe is provided eccentrically within the housing. The housing is installed with the broader side parallel to the building wall.

The downpipe filter known from GB 239 1182 A fits to a circular downpipe cross-section and comprises a round housing which is eccentric with respect to the axis of the downpipe.

The device for branching-off rainwater from a downpipe as known from FR 2675171 A fits to a round downpipe cross-section and comprises a rectangular housing.

The rainwater collector known from DE 102 23 820 A fits between round downpipe ends and comprises a round housing having a double wall structure.

For architectonic or other reasons quadrangular, i.e. square or rectangular downpipes are provided extensively. Conventional downpipe filters cannot be combined with rectangular downpipes. Even if the housings of both above-mentioned known downpipe filters were to be modified to be mounted at rectangular downpipes only one predetermined position of the outlet for branched-off rainwater exists because the housing could not be rotated due to the rectangular cross-section of the downpipe. This would mean that a rainwater barrel has to be placed either directly in front of the downpipe filter and distant from the building wall, causing, in some cases, an unpleasant appearance, or that in case of a rainwater barrel placed sidewardly from the downpipe as close as possible to the building wall a strongly bent overflow connection would be needed which consumes much installation space and would result in disadvantageous flow conditions and a tendency to collect dirt.

In other application cases, it might become necessary to remove and withhold mainly foliage from the rainwater in the downpipe, e.g. because rainwater is guided into a percolation system. A foliage remover for a circular downpipe is known from the mentioned catalogue R26, page 43.

SUMMARY OF THE INVENTION

It is an object of the invention to provide a downpipe filter of the kind as disclosed at the beginning, however for quadrangular downpipes, which downpipe filter allows to install a straight overflow connection irrespective of the positioning of e.g. a rainwater barrel in relation to the downpipe or the building wall.

As the outlet is provided at the housing intermediate section which can be rotated in relation to the housing parts about the housing axis, the outlet can be brought into each position even after mounting the downpipe filter at the rectangular downpipe ends, in order to connect the outlet with the arbitrarily placed rainwater barrel via a overflow connection which is as straight as possible. This overflow connection can be formed expediently from a rigid tube or hose. This means that it does not matter when mounting the downpipe filter, where, later, the rainwater barrel will be placed, and when the position of the placement of the rainwater barrel has to be changed with the downpipe filter already mounted, because the outlet always can be aligned according to the placement of the rainwater barrel. Since only the housing intermediate section is rotated together with the outlet, while the other inner components of the downpipe filter do not have to rotated with them, which inner components are needed to guide the water and for removing dirt, the through flow conditions and the gain, expediently, will not be changed when the housing intermediate section is rotated.

Expediently, the housing has a substantially circular outer contour the centre axis of which is the housing axis. The mounting ports for the rectangular downpipe ends, which are essentially aligned with each other, are located off-centre, preferably so far that they are situated at the inner side or the outer side adjacent to the outer contour. This concept does not only result in a very pleasant appearance of the downpipe filter, but also does not consume any or only minimum mounting space between the downpipe and the adjacent building wall. This means that the downpipe filter can also be installed if the downpipe e.g. is located at the or in a recessed groove of the building wall.

The upper and lower housing parts, in an expedient embodiment, are formed as respective caps into which square, exteriorly placed insertion boxes for downpipe ends are integrated. Furthermore, each housing part has an interiorly placed circular socket for one end of the housing intermediate section which, preferably is substantially cylindrical. Even though the insertion boxes are not round, meaning that the mounting position of the housing at the downpipe ends is given, the housing intermediate section comfortably may be rotated within the circular sockets.

In another or modified embodiment, the downpipe filter may be used for removing foliage by inserting selectively a housing intermediate section between the upper and lower housing parts, which housing intermediate section is designed in view to the object of removing foliage. This means that the downpipe filter is either basically installed for removing foliage or for branching off of rainwater, or is selectively modified upon demand. When using the housing intermediate section for removing foliage, the purified rainwater exiting the downpipe filter at the lower end is guided into a percolation facility, the proper function of which could be jeopardized by too much foliage.

A further aspect of the invention is that the respective insertion box is formed as a selectively modifiable adaptor which may be adapted to different sizes of square downpipe ends. Expediently, a shaft is provided which has a maximum size of square downpipe ends, into which shaft adaptor parts may be inserted or from which adaptor parts may be removed in order to adapt the insertion box size to the respective size of the downpipe end.

With a view to manufacturing, the outlet for branched-off water is a tube socket which extends substantially perpendicular with respect to the housing axis and which is prolonged within the housing intermediate section to a container that is open at the upper side. A bottom outlet of the collection trough is rotatably received in this container such that the container can be rotated together with the housing intermediate section while the collecting trough does not change position in the housing. Expediently, the container is positioned substantially centrally in the housing intermediate section such that it can be bypassed on all sides by dirt and rainwater that is not branched-off, but allows the relative rotation of the housing intermediate section. A lateral strut of the housing intermediate section may be used to safeguard the positioning of the container. Removed dirt and, in particular, foliage are brought out via the lower downpipe end, e.g. into the canalisation system.

In order to safely position the collecting trough the collecting trough has a holding flange which is secured in the region of the socket between the upper housing part and the housing intermediate section so that the collecting trough is hindered against rotation in the upper housing part.

In order to allow to vary the gain or to inhibit any rain water gain during winter, expediently, a blocking sleeve is inserted between the outlet of the collecting trough and the container, which blocking sleeve can be rotated about the housing axis. This blocking sleeve, expediently, may be actuated from the outer side of the downpipe filter in order to either vary the gain or to block totally without the necessity to disassemble or demount the housing.

In this case the blocking sleeve may be provided with at least one blocking section and at least one passage, which follow each other in circumferential direction. A handle protruding from the blocking sleeve e.g. is accessible from the outer side and allows a comfortable rotation of the blocking sleeve.

In an expedient embodiment a recess is formed in the outer contour of the housing intermediate section. The recess is limited in circumferential direction and is open at the lower side. A grip provided on the handle engages from the lower side into the recess. This grip is accessible at the outer side of the housing intermediate section. Furthermore, the grip visually indicates the purpose, namely to allow to adjust the blocking sleeve from the outer side. Alternatively, the handle may extend to the outer side directly through a slot in the housing intermediate section.

The passage and the blocking section of the blocking sleeve are provided in circumferential direction within an arcuate measure of e.g. about 60°. The arcuate measure of the recess in the housing intermediate section is selected such that the grip may be rotated in the recess about this e.g. 60°. In this fashion already the manufacturer of the downpipe filter can predetermine how the blocking sleeve is to be actuated such that it either opens the full passage cross-section in one end position of the grip or totally blocks the other grip end position.

In order to increase rigidity the cap forming the lower housing part may have ribs as a boundary of the socket. The lower edge of the housing intermediate section may abut on these ribs or even engage in undercuts bounded by the ribs such that at this location a proper rotational guidance and centering will be achieved.

The collecting trough has an opening edge which extends obliquely upwardly to the holding flange in order to define a collecting surface which is as large as possible. A sieve body or filter body may be put on the opening edge and can be positioned there in removable fashion by a plug-in connection or a snap connection.

When the downpipe filter is used for removing foliage, the outlet in the correspondingly designed housing intermediate section expediently is a tube socket that descends obliquely in relation to the housing axis and is formed around a passage opening in the wall of the housing intermediate section. The tube socket has, preferably, substantially the same inclination as the opening edge of the collecting trough in the housing. In order to prevent contamination flushed away from the sieve surface or filter surface, in particular foliage, reaching the lower exit end of the downpipe filter, an inclined body is provided that extends, preferably, substantially parallel to the edge of the opening and which bridges the intermediate space between the wall of the housing intermediate section and the collecting trough, and which extends to the passage opening. On the inclined guiding body, flushed-off foliage is guided into the outlet. The collecting trough only collects purified rainwater and guides the purified rainwater to the lower exit end of the housing. The guiding body is integrated into the housing such that the housing intermediate section, at least within limits, can be rotated about the housing axis relative to the upper and lower housing parts in order to allow the adjustment of the outlet into a desired rotary position that is independent from the position of the quadrangular downpipe.

Expediently, at least a part of the guiding body or the entire guiding body is provided unitarily in the housing intermediate section.

In an alternative embodiment, at least a part of the guiding body or the entire guiding body may be provided at the collecting trough, in order to allow the rotation of the housing intermediate section together with the exit relative to the collecting trough and the guiding body, at least to a limited extent.

The passage opening for removing foliage may be wider in the lateral direction than in the vertical direction, preferably with a size of the cross-section that is larger than a human hand. This does not only assure the removal of foliage in the case of a heavy foliage load without the danger of a blockage of the exit, but also allows occasionally engaging with a hand from outside.

Expediently, a bottom outlet of the collecting trough is, preferably, rotatably received in a tube socket, which is provided centrally within the housing intermediate section, such that the collecting trough is supported in a stable manner. The tube section may be provided on at least one lateral strut of the housing intermediate section and may be, preferably, formed unitarily with the housing intermediate section.

Expediently, the components of the downpipe filter are plastic material injection moulded parts.

Other systems, methods, features and advantages of the invention will be, or will become, apparent to one of ordinary skill in the art upon examination of the following Figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the Figures are not necessarily to scale, emphasis instead being placed upon illustrating the principles of the invention. Moreover, in the Figures, like reference numerals designate corresponding parts throughout the different views.

An embodiment of the invention will be explained with the help of the drawings. In the drawings is:

FIG. 2 is an exploded illustration of the components of the downpipe filter,

FIG. 3 is a perspective sectional view explaining the functional principle of the downpipe filter.

DETAILED DESCRIPTION OF THE PREFERRED EMBODIMENTS

Figure 1:
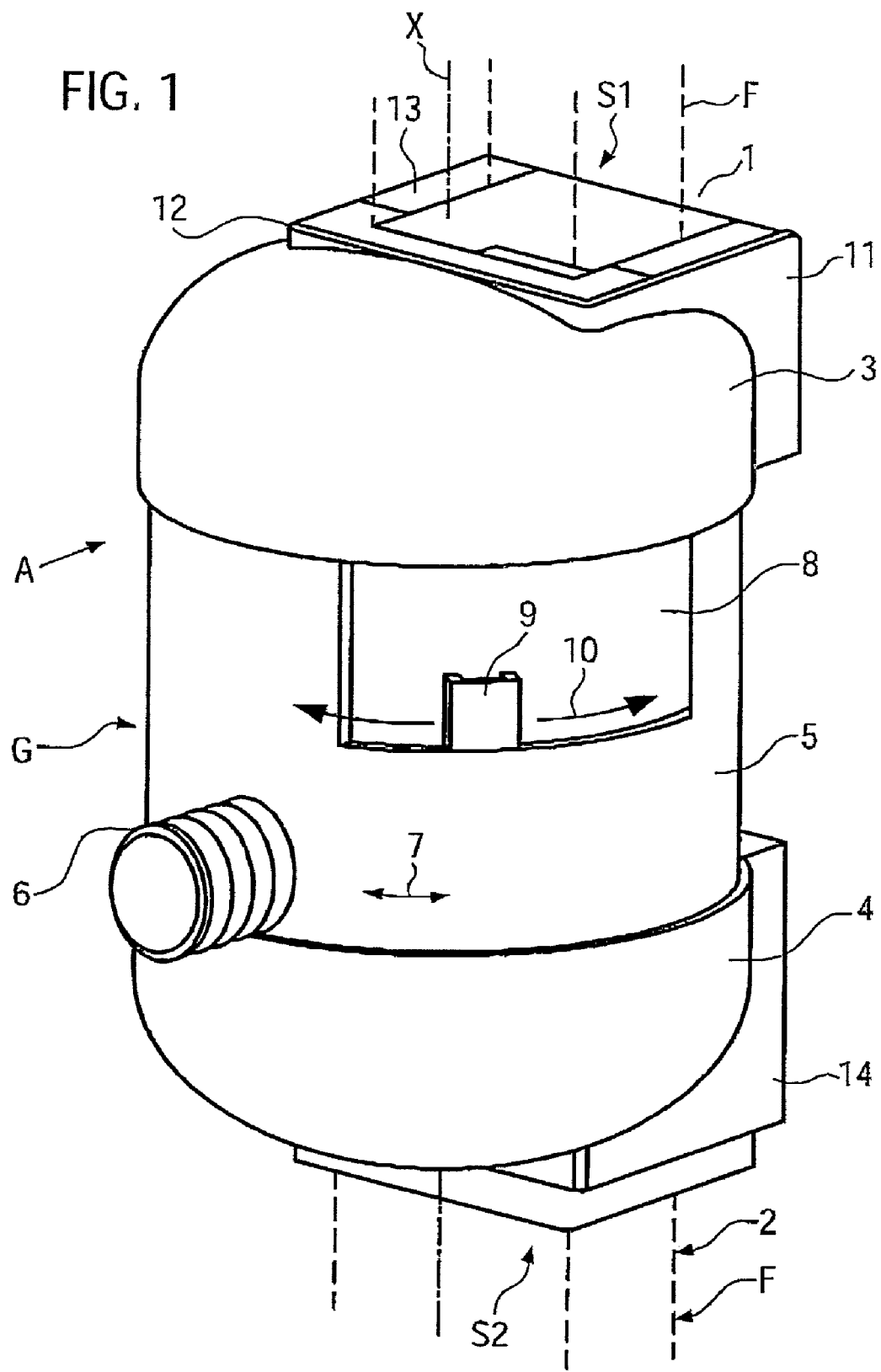
FIG. 1 is a perspective view of a downpipe filter.

A downpipe filter A shown in a total view in FIG. 1 e.g. serves to branch-off rainwater from a downpipe F. Contamination is substantially removed when the rainwater is brought in a selectable gain via an outlet 6 to a not shown rainwater collecting container, in order to systematically use branched-off rainwater. The downpipe F has a quadrangular cross-section, e.g. a square or rectangular cross-section. Expediently, the downpipe filter A is mounted, as shown, in a break of the downpipe F between an upper downpipe end 1 and a lower downpipe end 2. Alternatively, the downpipe filter A could be mounted at one downpipe end only and could guide the remaining rainwater, which has not been branched-off, downwardly into the canalisation or the like.

In the shown embodiment the downpipe filter A has a substantially cylindrical housing G comprising an upper part 3, a lower part 4, respectively formed as a cap, and a housing intermediate section 5, which housing intermediate section 5 can be rotated in relation to the housing parts 3, 4 and the downpipe F about a housing axis X in the direction of a double arrow 7 back and forth in order to adapt the position of the outlet 6 to the position of a not shown rainwater barrel or another collecting container, i.e., to produce a largely straight and, expediently, overflow connection between the outlet 6 and the collecting container, which overflow connection is characterised by good flowing conditions and which is not prone to collect contamination. The overflow connection e.g. can be established by means of a rigid tube or a hose.

Each housing part 3, 4 has a mounting port S1, S2 for one downpipe end 1, 2. The respective mounting port S1, S2 consists of an insertion box 11, 14 integrated into the housing part 3, 4. The mounting port S1, S2 e.g. has a square shaft 12 in the upper part 3 and a corresponding shaft in the lower part 4, the shaft e.g. having the maximum size of a square downpipe end. The shaft in the lower part 4 is formed with a plug-in boss 12a with the form of a square which can be put over or can be put inside the lower downpipe end 2.

In order to allow to use the same downpipe filter A for differently dimensioned quadrangular downpipes F the mounting ports S1, S2 are designed as adaptors. For example, removable adaptor parts 13, 13a are provided within the respective shaft 12 or 12a. In case of a downpipe F having the maximum square dimension, the adaptor parts 13, 13a will be removed. For a smaller downpipe size, adaptor parts will remain or will be inserted, respectively.

Figure 5:
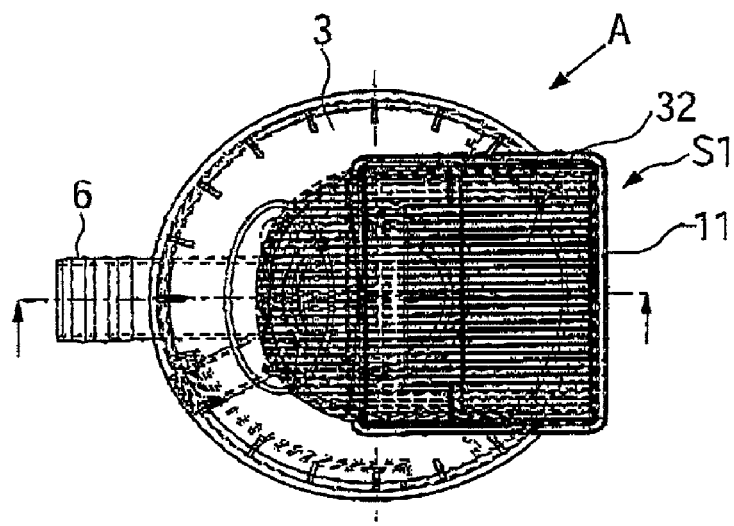
FIG. 5 is a top view of the downpipe filter of FIG. 4.

According to FIGS. 1 and 5 the respective mounting port S1, S2 is arranged off-centre in relation to the housing axis X, such that the outmost contour of the insertion box 11 or 14 is just within the contour of the housing G or even is flush with the contour of the housing G, or even (FIG. 6) protrudes a little bit beyond the contour to the outer side. In this case no additional mounting space is needed for the downpipe filter at the rear side of the downpipe.

The outlet 6 for water that is to be branched off is located in the lower part of the housing intermediate section 5. In the shown embodiment a recess 8 is formed above the outlet 6 in the outer contour of the housing intermediate section 5. The recess 8 extends over a limited part of the circumference and is open at the lower side towards the interior of the housing. A grip 9 is placed in FIG. 1 in the recess 8, which grip 9 can be moved in the direction of a double arrow 10 within the limitation defined by the recess 8. The purpose of the grip 9 will be explained below.

In the exploded illustration in FIG. 2 the components of the downpipe filter A are shown, expediently, all of which or substantially all are plastic material injection moulded parts.

A filter body or sieve body 31 is installed in the interior of the housing G below the mounting port S1. The filter body or sieve body 31 defines an obliquely descending sieve surface 32.

The sieve body 31 is secured on an opening edge 21 of a collecting trough 27, e.g. by a snap connection. The collecting trough 27 has the opening edge 29 ascending obliquely to a holding flange 30. An outlet 28 with the shape of a tube socket extends from the bottom of the collecting trough 27 downwardly. The outlet 28 is placed substantially centrally with respect to the housing axis X.

Figure 4:
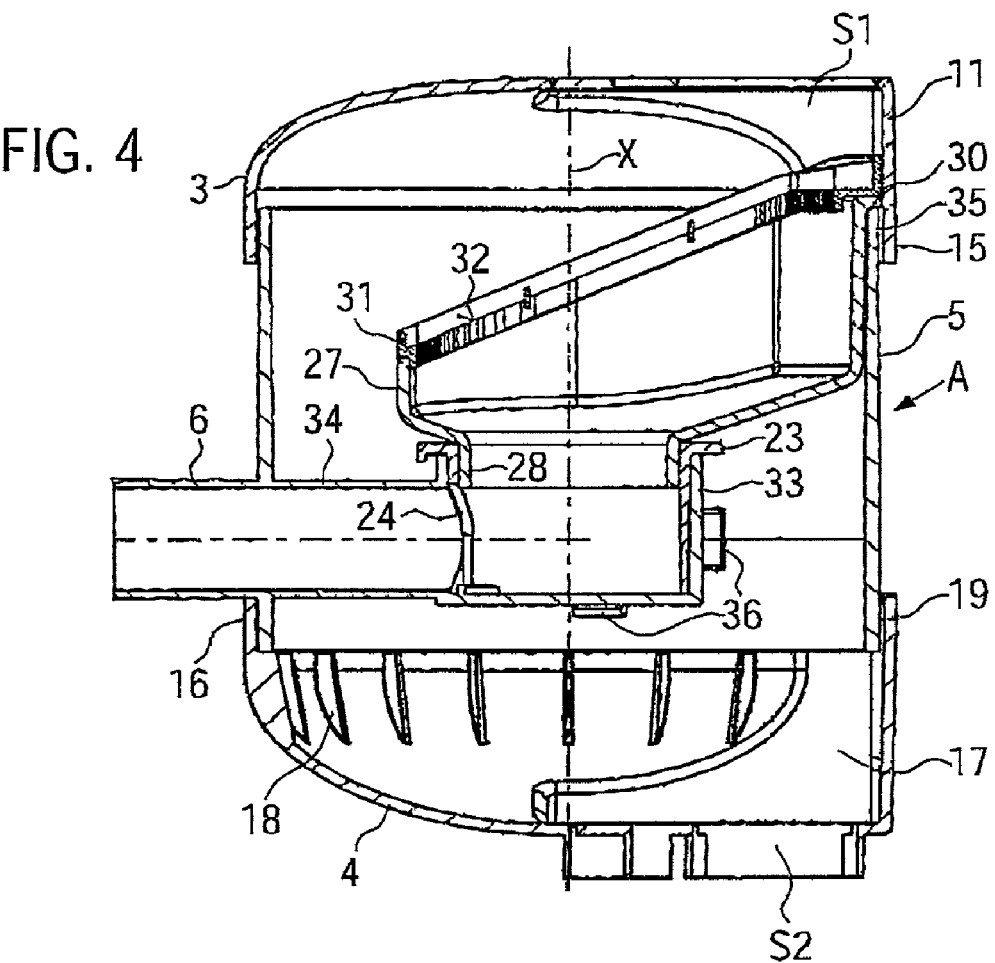
FIG. 4 is a vertical section of the downpipe filter.

The outlet 28 is, as shown in the sectional view of FIG. 4, inserted from the upper side into a blocking sleeve 23. The blocking sleeve 23—in circumferential direction—has a passage 24 and adjacent to the passage 24 a blocking section 25 in the outer wall. Furthermore, a handle 26 extends from the upper side of the blocking sleeve to the outer side. In the shown embodiment, the grip 9 shown in FIG. 1, is provided on the handle 26. The grip 9 is put in from the lower side into the recess 9 and is accessible from the outer side.

In the shown embodiment, the housing intermediate section 5 is formed substantially cylindrical with upper and lower ends 21, 22. The ends 21, 22 are inserted into a circular socket 35 (FIG. 4) for the upper end 22 and into a circular socket 19 (in the lower housing part 4) such that the housing intermediate section 5, as already mentioned, may be rotated in the direction of the double arrow 7 about the housing axis X in relation to the upper and lower housing parts 3, 4. At least partly also the blocking sleeve 23 follows this rotation, while the other components are mounted stationarily. The recess 8 in the housing intermediate section 5 is open at the lower side at 20 in order to allow introducing the grip 9 there from the lower side and to allow air to circulate there. In case of a blockage or of backwater, even water may exit there.

The lower housing part 4 has an edge 16 within which the circular socket 19 for the end 21 is formed and which e.g. is bounded by ribs 18 such that the socket 19 in some cases forms an undercut for the end 21. Furthermore, at least one guiding wall 17 is shown in the shaft 12a of the lower insertion box 14, which guiding wall 17 extends substantially vertically.

The downpipe filter A as assembled corresponding to FIG. 1 or FIG. 4 is then mounted at the downpipe ends 1, 2 and functions according to FIG. 3 as follows:

Water W containing contamination D, like e.g. foliage, flows in FIG. 3 through the mounting port S1 and directly on the sieve surface 32. The contamination D is largely removed along the obliquely descending sieve surface 32 and is flushed away as indicated by an arrow such that it then flows in the free intermediate space between the housing intermediate section 5 and the collecting trough 27 into the lower housing part 4 and further, in some cases mixed with water W through the lower mounting port S2 out of the housing. The water having passed the sieve surface 32 is guided by the collecting trough 27 obliquely downwards and through the outlet 28 and the blocking sleeve 23 into a container 33 which is open at the upper side and, in this embodiment, is cylindrical. The container 33 is connected via a prolongation 34 in unitary fashion with the outlet 6. The branched-off water W leaves the downpipe filter A through the outlet 6, provided that the blocking sleeve 23 is aligned (as shown) with the passage 24 to the prolongation 34.

A maximum gain of branched-off rainwater is achieved if the passage 24 is fully aligned to the prolongation 34. Depending on how far the grip 9 is displaced in the recess 8, the passage 24 is shifted relative to the mouth of the prolongation 34 like an aperture in order to increasingly throttle the passage cross-section and to reduce the gain. As soon as the blocking section 25 is placed in front of the mouth of the prolongation 34, no rainwater at all will be branched-off.

The passage 24 and the blocking section 25 e.g. are arranged in the blocking sleeve 23 within a circumferential region of about 60°. The grip 9 can be rotated in the recess 8 over these 60° in order to vary the gain between zero and maximum.

FIG. 4, furthermore, indicates that the circular socket 35 for the upper end 22 of the housing intermediate section 5 and also for the holding flange 30 of the collecting trough 27 is formed within the edge 15 of the upper housing part 13. In similar fashion, the circular socket 19 for the lower end 21 of the housing intermediate section 5 is formed in the lower housing part 4, such that the end 21 may abut on the ribs 18 or even may grip into an undercut position of the ribs 18.

FIG. 4 shows that the filter body or sieve body 31 is snapped on the edge of the collecting trough 27 and abuts with an upper end flange at the inner side at the housing part 3 in the insertion box 11, such that no contamination is allowed to enter the collecting trough 27, and that the collecting trough 27 maintains the mounting position.

The blocking sleeve 23 is seated with an outer flange on the upper edge of the container 33 which is formed at the prolongation 34. The container 33 is supported substantially centrally e.g. on lateral struts 36 of the housing intermediate section 5. In the operational position shown in FIG. 4 the passage 24 is aligned with the prolongation 34 (maximum gain of branched-off rainwater).

In some cases sealings may be provided within the sockets 35 and 19. The handle 26 alternatively could protrude outwardly directly through a horizontal slot (not shown) formed in the housing intermediate section 5, or even may be hidden behind a lid which can be opened. Furthermore, a respective snap-in connection or a ratch connection may be provided between the housing intermediate section 5 and the housing parts 3, 4 in order to prevent an undesirable opening of the housing. Alternatively, even releasable fixation elements could be used for this purpose.

FIG. 5 shows clearly that the mounting port S1 directly aims on the sieve surface 32, and that the right side end wall of the insertion box 11 substantially is flush with the outer contour of the housing or even protrudes a little bit to the outer side beyond the outer contour of the housing. A hose or tube can be put on the outlet 6 which is formed as a tube socket and may have circumferential outer ribs in order to facilitate installing the overflow connection to the water collecting container.

In a not shown embodiment the entire housing may be rotatable in relation to the mounting ports S1, S2. In this case the housing could be made unitary or could consist of two housing halves that are connected to each other. In this case and for adjusting the position of the outlet 6 so to speak about the downpipe axis, the housing will be rotated relatively to the downpipe end 1, 2.

Figure 6:
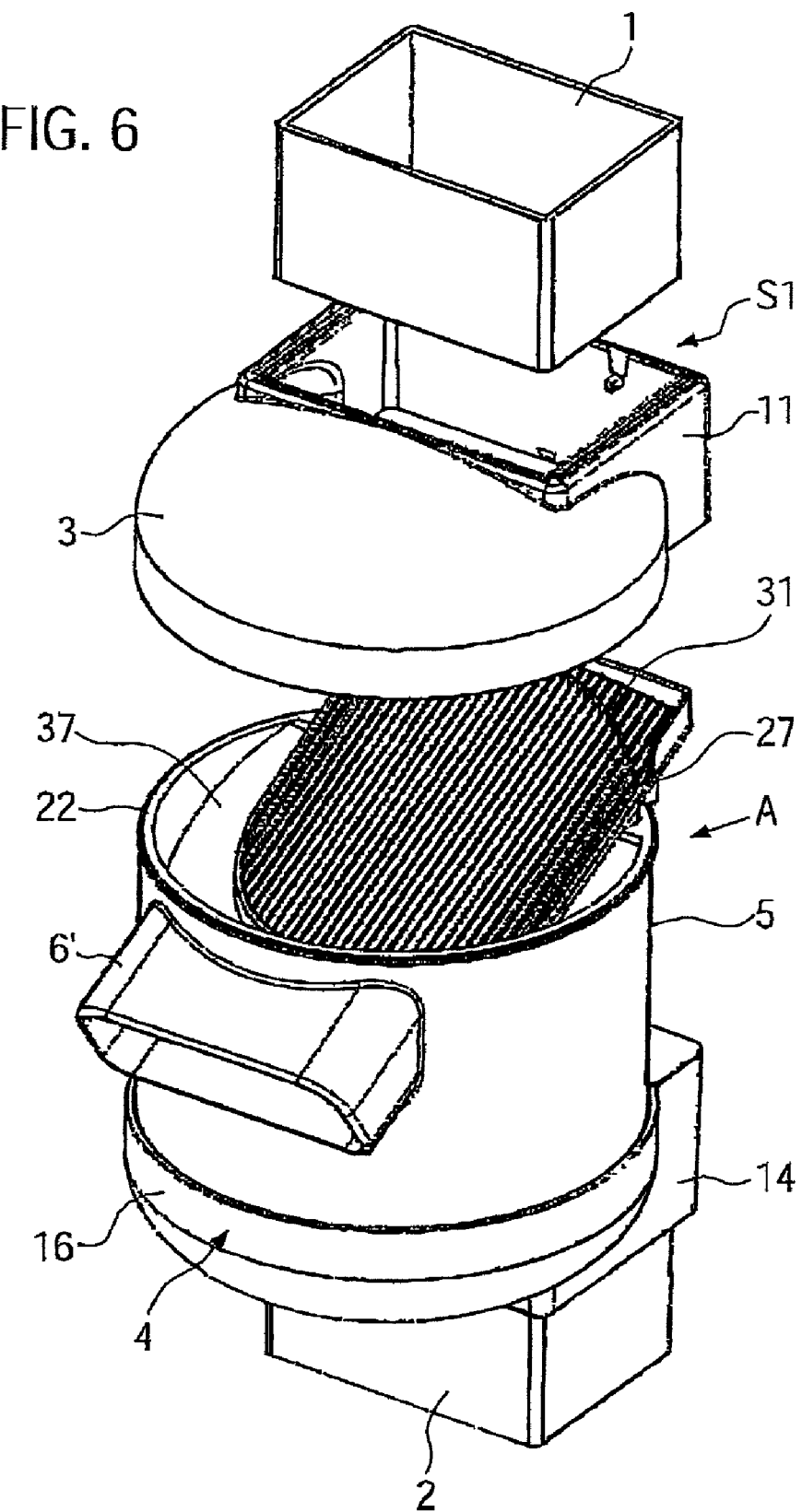
FIG. 6 is an exploded illustration of another or modified embodiment of a downpipe filter mainly for removing foliage.
Figure 7:
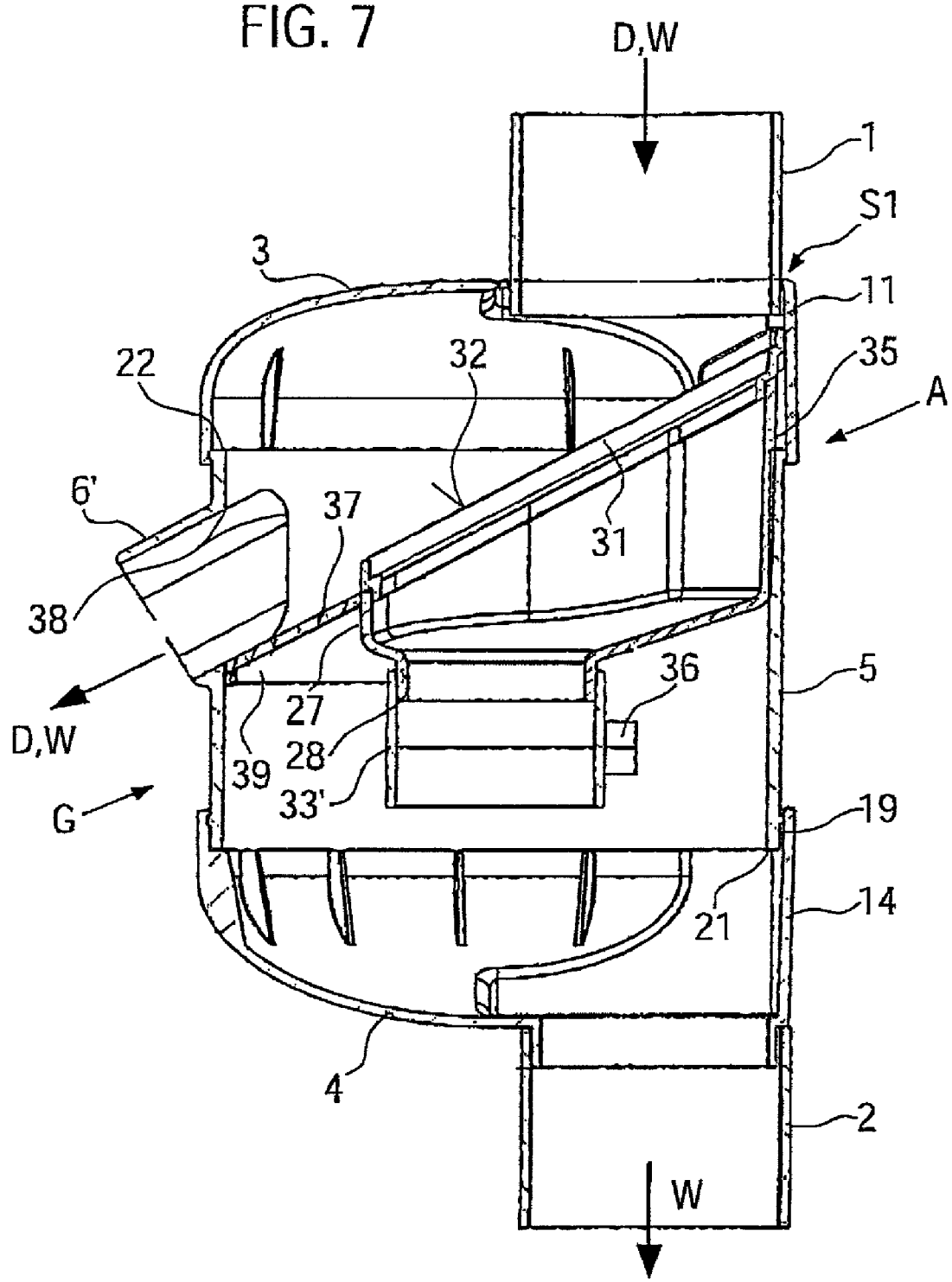
FIG. 7 is an axial section of the downpipe filter of FIG. 6.

The embodiment of the downpipe filter A in FIGS. 6 and 7, serving to removing foliage and other coarse contamination from rainwater in a quadrangular downpipe, e.g. is expedient when rainwater from the downpipe is guided into a percolation facility. This embodiment differs from the embodiment of FIGS. 1 to 5 in that the housing intermediate section 5 e.g. is provided with a larger or other outlet 6, 6' than the outlet 6, and that an inclined guiding body 37 is provided in the housing intermediate section 5. The guiding body 37 extends to the outlet 6, 6', surrounds the collecting trough 27 and prevents that coarser contamination and foliage, when flushed off from the sieve surface or filter surface 32, reach the quadrangular downpipe end 2. Furthermore, the inclined guiding body 37 allows flushing removed foliage out through the outlet 6, 6'.

The housing intermediate section 5 in FIGS. 6 and 7 is substantially of the same dimension as the housing intermediate section 5 in FIGS. 1 to 5. However, the housing intermediate section 5 in FIGS. 6 and 7 may be longer or shorter than the housing intermediate section 5 in FIGS. 1 to 5. The upper and lower ends 21, 22 of the housing intermediate section 5 fit into the circular sockets 35 and 39 of the upper and lower housing parts 3, 4, which also in this case are formed as caps. The collecting trough 27 inserted into the housing can be similar to the collecting trough of FIGS. 1 to 5, as also the sieve body or filter body 31 with the sieve surface or filter surface 32. The collecting trough 27 and the sieve body 31 are safeguarded against rotation in the respective mounting positions in the upper housing part 3, as in FIGS. 1 to 5. The lower outlet end 28 of the collecting trough 27 is inserted from above into a pipe socket 33, 33', which is provided centrally in the housing intermediate section 5, e.g. on lateral struts 36. The lower end of the tube socket 33, 33' opens to the lower housing part 4.

The guiding body 37, expediently, extends substantially as obliquely as the downwardly descending opening edge of the collecting trough 27 and bridges the intermediate space between the wall of the housing intermediate section 5 and the collecting trough 27 to a passage opening 38 in the wall of the housing intermediate section 5. The passage opening 38 is surrounded by the outlet 6, 6', which e.g. has a laterally extending rectangular or oval shape. The passage opening 38 and the outlet 6, 6', expediently, are sized with a cross-section area that allows gripping from outside with the human hand inwardly towards the sieve surface 32.

In the embodiment shown in FIGS. 6 and 7, the guiding body 37 is formed with a lower skirt 39 at the collecting trough 27. The lower skirt 39 contacts the wall of the housing intermediate section 5. Alternatively, the guiding body 37 could be put on the collecting trough 27 such that the housing intermediate section 5 can be rotated relative to the upper and lower housing parts 3, 4 about the housing axis X in order to adjust the outlet 6, 6' in a desired rotary position irrespective of the installation position of the quadrangular downpipe.

When using the downpipe filter A shown in FIGS. 6 and 7, rainwater W mixed with contamination, in particular foliage D, is flowing through the upper downpipe end 1 onto the sieve surface 32. Coarser contamination and foliage are withheld and will be flushed via the inclined sieve surface 32 on the inclined guiding body 37 before they flow outwardly through the outlet 6, 6'. Purified rainwater W, which has passed through the sieve surface 32, is guided by the collecting trough 27 through the tube socket 33, 33' into the lower housing part 4 and then into the lower downpipe end 2, before it e.g. is guided into a percolation facility. When removing foliage, in some cases the rotary position of the outlet 6, 6' may be rather secondary, as e.g. the foliage is guided onto the ground. In some cases, a limited rotation range of the outlet 6, 6' may be sufficient.

The downpipe filter A may be retrofit between both embodiments by e.g. axially displacing one downpipe end 1 or 2 axially and by separating then the upper and lower housing parts 3, 4 from the present housing intermediate section 5. Then, the formerly used housing intermediate section 5 is changed against the other housing intermediate section 5 (either for branching-off rainwater or for removing foliage). The respectively needed housing intermediate section 5 then again is connected to the upper and lower housing parts 3, 4, before the displaced downpipe end is returned into the home position. Alternatively, it is possible to completely replace the pre-installed downpipe filter A for the one or the other function (either branching-off rainwater or removing foliage) against the other rainwater downpipe filter A (for removing foliage or for branching-off rainwater).

Alternatively, the guiding body 37 could be connected (e.g. without the lower skirt 39) with the housing intermediate section 5 and could rotatably surround a circular lower part of the collecting trough 27, which lower part is centred on the housing axis X (not shown). Furthermore, it is possible to provide co-acting parts of the guiding body 37 at the housing intermediate section 5 and at the collecting trough 27, respectively (not shown).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A downpipe filter comprising a housing which is to be mounted in a downpipe break between downpipe ends, the housing having an outlet for branched-off water, said outlet oriented outwardly and laterally to the downpipe axis, the housing receiving an inner sieve device and a collecting trough communicating with the outlet characterised in that the housing comprises
   upper and lower housing parts defining a housing axis, each housing part having a mounting port for a square downpipe end, and
   an intermediate section rotatable in relation to the housing part substantially about the housing axis and at which the outlet is provided.

2. The downpipe filter according to claim 1, characterised in that the housing has a substantially circular outer contour, that the central axis of the outer contour is the housing axis, and that the mounting ports substantially aligned to each other are arranged out of centre in relation to the housing axis and offset outwardly such that they lie adjacent to the outer housing contour from the inner side or the outer side.

3. The downpipe filter according to claim 1, characterised in that the upper and lower housing parts are formed as caps, each cap having an integrated square, exteriorly placed insertion box for one downpipe end and an interiorly placed, circular socket for one end of the housing intermediate section, said housing intermediate section is substantially cylindrical between the ends and has circular ends.

4. The downpipe filter according to claim 3, characterised in that a housing intermediate section adapted for branching-off rainwater or for removing mainly foliage outwardly through the exit is provided between the upper and lower housing parts, and that, preferably a respective housing intermediate section is inserted selectively between the same upper and lower housing parts.

5. The downpipe filter according to claim 4, characterised in that, for removing predominantly foliage the outlet in the housing intermediate section is a tube socket inclined obliquely downwardly in relation to the housing axis, and which surrounds a passage opening of the wall of the housing intermediate section, and that an inclined guiding body extending to the passage opening is provided in the housing intermediate section to bridge the intermediate space between the wall of the housing intermediate section and the collecting trough, the guiding body being inclined substantially with the same inclination as an opening edge of the collecting trough.

6. The downpipe filter according to claim 5, characterised in that at least a part of the guiding body is provided in the housing intermediate section.

7. The downpipe filter according to claim 5, characterised in that at least a part of the guiding body is provided at the collecting trough.

8. The downpipe filter according to claim 5, characterised in that the passage opening is wider in the lateral direction than in the vertical direction, and preferably has a cross-section area that is larger than a human hand.

9. The downpipe filter according to claim 5, characterised in that a bottom outlet of the collecting trough is rotatably received in a tube socket which is supported centrally in the housing intermediate section on at least one lateral strut.

10. The downpipe filter according to claim 3, characterised in that each respective insertion box is formed as a selectively modifiable adaptor for adaptation to different downpipe sizes, by means of adaptor parts provided for being inserted into or removed from a respective shaft which has a maximum downpipe size and interiorly located guiding walls.

11. The downpipe filter according to claim 3, characterised in that the collecting trough has a holding flange positioned in the region of the socket between the upper housing part and the housing intermediate section and thereby hinders the collecting trough against rotation within the upper housing part.

12. The downpipe filter according to claim 3, characterised in that at least cap defining the lower housing part comprises ribs bounding the socket.

13. The downpipe filter according to claim 1, characterised in that the outlet is a tube socket which extends substantially perpendicular with respect to the housing axis from the outer side into the interior of the housing intermediate section and there to a container which is open at the upper side, and that a bottom outlet of the collecting trough is rotatably received in the container.

14. The downpipe filter according to claim 13, characterised in that a blocking sleeve rotatable about the housing axis is disposed between the outlet of the collecting trough and the container.

15. The downpipe filter according to claim 8, characterised in that the blocking sleeve is provided with at least one blocking section and at least one passage, which are arranged behind each other in circumferential direction, and a handle on the blocking sleeve said handle protruding to the outer side adapted to be gripped from the outer side.

16. The downpipe filter according to claim 15, characterised in that a recess is formed in the outer contour of the housing intermediate section said recess is open at the lower side and is limited in a circumferential direction, and wherein the handle engages a grip from the lower side into the recess, the grip positioned for access from the outer side of the housing intermediate section.

17. The downpipe filter according to claim 15, characterised in that the passage and the blocking section are situated in circumferential relation within about 60°, and that the grip is rotatable in the recess over about 60° about the housing axis.

18. The downpipe filter according to claim 1, characterised in that the collecting trough comprises an opening edge which extends obliquely upwards to the holding flange, and that a sieve body is removably placed on the opening edge, the shape and size of the sieve body largely corresponding to the shape and size of the opening edge.

19. The downpipe filter according to claim 1, characterised in that the components of the downpipe filter are plastic material injection moulded parts.

* * * * *